Jan. 15, 1957 G. M. BEAUMONT 2,777,274
ROLLER-TYPE LAWN MOWER
Filed May 16, 1955
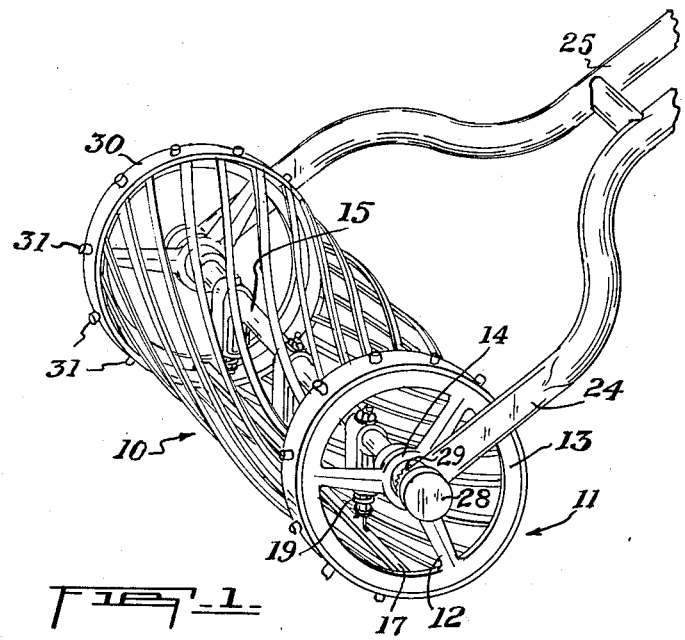
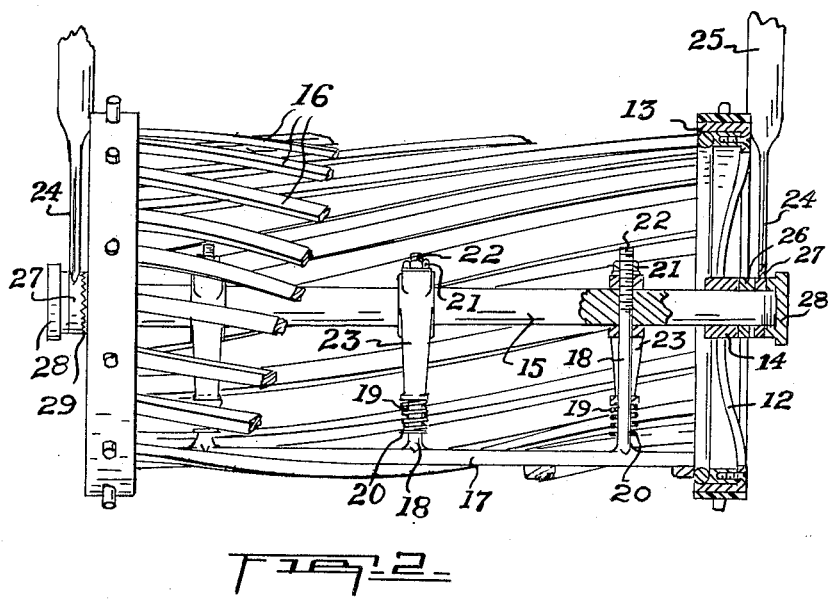
INVENTOR.
GERALD M. BEAUMONT
By Fetherstonhaugh Co.
ATTORNEYS

United States Patent Office 2,777,274
Patented Jan. 15, 1957

2,777,274

ROLLER-TYPE LAWN MOWER

Gerald M. Beaumont, Saskatoon, Saskatchewan, Canada

Application May 16, 1955, Serial No. 508,635

9 Claims. (Cl. 56—249)

This invention relates to lawn mowers, and particularly to manually-powered, revolving-blade lawn mowers.

The conventional type of lawn mower which is universally known utilizes a series of spirally mounted blades which revolve toward a fixed bar. The blades are constructed of hardened steel and cut by shearing action against the fixed bar. The number of blades is varied, usually 4 or 6 depending on the model, and the efficiency is obtained by providing a stepped-up gearing, so that a relatively slow forward motion of the machine allows a rapid rotation of the blades. The construction of such a machine is thus complicated by the presence of the gearing and in order to avoid strain in the gear train, a clutch is necessary. This allows the rotating blades to slow down more or less gradually after the forward motion of the machine has stopped, but it also represents wasted power, well known by the characteristic sounds accompanying the operation of a conventional mower.

It is the principal object of the present invention to provide a novelly-constructed lawn-mower which is manually powered and characterized by simplicity and economy of design while achieving good efficiency.

The lawn mower of the present invention overcomes the disadvantages of the prior art through the novel construction comprising a substantially cylindrical cutter drum adapted to be propelled across the surface of a lawn so as to engage the vegetation. A shearing bar is mated to the inner surface of the cylindrical drum and held substantially at the height to which the vegetation is to be trimmed so that rotation of the drum forces the grass or other vegetation against the shearing bar, whereby it is trimmed off. In a preferred form of this construction, the drum is constructed with a pair of end members, each formed substantially as a wheel comprising a hub adapted freely to rotate upon an axle, a plurality of radially spaced spoke members mounted on said hub and an annular rim member supported by said spoke members. Between the pair of end members a plurality of substantially helically mounted guide members are disposed in spaced relation to complete the construction of the cylindrical drum. In the end wheels the spacing of the spoke members should be sufficiently great to allow ready access to the inside of the cylindrical drum for the purposes of adjustment as will be understood from the detailed description given hereinbelow. If desired, I may provide annular tire means mounted on each rim member for the primary purpose of raising the cutting surface of the mower. When tire means are used, they are preferably fabricated with lugs adapted to achieve adequate traction.

The shearing bar is mounted within the cylindrical cutter drum in a substantially fixed position and does not rotate with the drum. To allow the operator to alter the height at which the vegetation is trimmed, it is preferred to have adjustable mounting of the shearing bar.

The lawn mower of the present invention will be better understood from the following detailed description with particular reference to the accompanying drawings in which:

Figure 1 is an isometric view of a lawn mower according to the present invention, and Figure 2 is a front view, partially cut away and partially in section, showing the cylindrical cutter drum.

In the drawings, the revolvable cylindrical cutter drum is represented by the reference numeral 10. In the preferred construction, the drum 10 comprises a pair of wheel members 11, which preferably have three spoke members 12 spaced at 120° intervals as illustrated, and an annular rim mmeber 13. Each wheel member 11 is provided with a hub 14 which is adapted to receive one end of the axle 15 in a freely revolvable manner. The hub 14 may take the form of a simple sleeve bearing as illustrated or may comprise any suitable type of friction-reducing bearing as desired. The circumferential wall of the cylindrical drum 10 comprises a plurality of guide members 16, the guide members being mounted at their ends to the rim portion 13 of wheel members 11. The function of the guide members 16 is to gather in the grass or vegetation by engaging the upper portion of vegetation to be cut and pulling it downwardly where it may be trimmed. To allow each guide member 16 an optimum stroke, I prefer to form them on substantially helical lines, so that they are disposed at an angle to the axis of rotation of the cutter drum 10 but perpendicular to the right cross-section of said drum. In practice an angle of about 15° has been found to be satisfactory. The efficiency of the cutter drum 10 in the machine of the present invention depends upon the spacing of the guide members 16, and in the case of a machine having a 9" diameter cutter drum, efficient operation may be obtained when the guide members are spaced at about 20° intervals. The size of the bars or strips from which the guide members 16 are formed is not critical, and any suitable cross-section may be engaged. In a preferred form of the invention, I fabricate the guide members from stock having a tapered cross-section, the narrow edge being placed inwardly to form the inner surface of the drum 10.

The cutter drum 10, which is secured to the wheel members 11, revolves about the non-rotatable axle 15 as described. Within the drum 10, a shearing bar 17 is secured by means of mounting posts 18 to the axle 15 so that it bears against the inner surface of the drum 10 along a line at approximately the bottom dead center and substantially parallel to the axis of rotation.

The shearing bar 17 is preferably fabricated from material which is at least slightly harder than that from which the guide members 16 are made, so that the shearing bar 17 can actually cut into the guide members 16 to maintain at all times a perfectly mated inner surface in the cylinder 10.

In the preferred embodiment of the invention the shearing bar 17 is adjustably mounted on the axle 15 so that the pressure of the bar 17 against the inner surface of the drum 10 can be adjusted to compensate for the wear of the inner surface. Clearly, the number of mounting posts 18 may be varied as desired, and need depend only on considerations of adequate strength and cost of construction. This preferred mounting is achieved by providing spring means 19 which bears against the stop member 20 on the post 18 and against the axle 15 to urge the shearing bar 17 against the inner surface of the drum 10. The limit to which the bar 17 can be urged outwardly is adjustable through provision of the nut 21 threadably engaged with the threaded end 22 of the post 18. The action of the spring 19 holds the nut 21 against the axle 15 providing a limit stop, and, as the surface of the drum 10 is worn it will be possible to adjust the nut 21 so that the limit is changed to compensate for the wear. To allow easy adjustment of the nut 21, it is necessary to have ready access to the interior of the drum 10. Hence, I prefer the form of construction of the wheels 11, described above. It will also be clear that the action of the spring means 19 on any of the mounting posts 18 allows the shearing bar 17 to be forced away from the cylindrical drum 10 should any hard material, such as a rock or nail or the like, be encountered. This arrangement, coupled with the fact that the speed of operation is slow, provides an almost damage-proof construction. To achieve added strength in the post 18, I may provide sleeve members 23 which are mounted on the axle 15 and have a transverse bore which is aligned with one of the transverse bars in the axle 15 to accommodate a post 18. Since the axle 15 is held non-rotatable, the above described mounting means will hold the shearing bar 17 in fixed relation as the drum 10 rotates and a shearing action will result between the mated surfaces of the bar 17 and the drum 10.

The axle 15 is maintained in a non-rotatable attitude by fixing it securely to the mounting bridle 24 of the handle means 25. It will be clear that if the handle means 25 are rocked considerably in an up and down direction, the cutter bar 17 will also be rotated through a small angle, but it is contemplated that in normal use the handle means 25 will be maintained at a substantially fixed angle relative to the ground.

To permit the operation of the mower by persons of widely different heights, the means for fixing the axle 15 to the mounting bridle 24 is adjustable. In a preferred form of this invention, a collar 26 is removably mounted on the axle 15 in a non-rotatable manner, for example, by means of a splined arrangement. The mounting bridle 24 is provided with a ring or yoke 27 adapted to embrace the axle 15, and a locking knob or retaining ring 28 threadably mounted on the outer end of the axle 15 and is adapted to force the collar 26 and the yoke 27 into fixed relative engagement, so that the handle means 25 is effectively rigidly coupled with the axle 15. The engaging surfaces of the collar 26 and the yoke 27 may be provided with interlocking teeth 29 to provide a positive engagement between the two parts, and still permit wide variation of the position of the handle means 25. It will be understood that the position of the handle means 25 should be adjusted so that the shearing bar 17 will be maintained in engagement with approximately the bottom dead center of the drum 10. The height of the cutting surface thus depends on the distance of the inner surface 10 above the ground level. In any given construction, the depth of the guide members 16 will be substantially constant and the height of the cutting surface can be best adjusted by providing tire means 30 on the rim portions 13 of the end wheels 11. Suitable radially disposed lugs 31 may be provided to achieve adequate traction.

It will be obvious that the lawn mower constructed in accordance with the teachings hereinabove is a machine of great simplicity. Therefore, the cost of production and the cost of maintenance lend great advantages to the present invention. The principle of operation is, as has been described the fact that the vegetation to be trimmed is allowed to intrude through the openings in the outer drum, whereupon it is forced against the shearing bar where it is trimmed. Clearly the machine will trim when it is rolling backwards equally as well as in the forward direction, and therefore it is of particular advantage for operation by home owners who have possibly small and irregular pieces of lawn. The action of the present device allows the grass of such lawns to be trimmed quickly and easily by a series of back and forth passes, thus allowing the job to be completed with a minimum of effort. The light construction and the slow speed of operation make the machine very easy to push, even in tough and wet grass. The construction according to the present invention is also less liable to clogging by wet grass, which impedes conventional machines. In this connection it should also be realized that the shearing surface, being the inner surface of the cutter drum, is always clear of the sod even when rolled along the edge of a terraced area, so that any possibility of digging into the roots of the grass, as sometimes occurs with conventional mowers, is eliminated through the construction of the present invention. Further, the slow speed lends greater safety in the operation of the machine and less possibility of damage.

What I claim as my invention is:

1. A trimming device revolvably mounted in a mounting bridle having handle means fastened thereto and arranged for manually propelling said trimming device, said device comprising a substantially cylindrical cutter drum, said drum being mounted for rotation in said mounting bridle upon rolling contact of the drum with a surface supporting material to be cut by said device, a plurality of openings in said drum arranged to allow vegetation to intrude therethrough, a cutter bar, and bar mounting means whereby said cutter bar is mounted in fixed relation to said mounting bridle and disposed within said cutter drum, said cutter bar being mated to the inner surface of said drum whereby a shearing action is obtained.

2. A trimming device as defined by claim 1 in which the cutter drum comprises a pair of substantially circular end members and a series of substantially helically-mounted guide members, said guide members being formed to provide substantially cylindrical inner and outer surfaces of revolution.

3. A trimming device as claimed in claim 1 in which the bar mounting means comprises a spring adapted to yieldably urge the bar against the inner surface of the cutter drum.

4. A trimming device as claimed in claim 1 in which the bar mounting means comprises an adjustable limit stop adapted to adjust the pressure of the cutter bar against the inner surface of the cutter drum.

5. A trimming device as claimed in claim 1 in which the bar mounting means comprises at least one mounting post fixed to the cutter bar, each said post having a stop member substantially adjacent said cutter bar, and having an adjustable limit stop on the other end thereof, each said post being arranged to pass through the fixed axle of the device, and spring means disposed between said stop member and said axle, said spring means being adapted to urge said cutter bar and said axle to mutually remote positions limited by said limit stop, whereby said cutter bar is yieldably urged against the inner surface of the cutter drum with a pressure which is adjustable by virtue of said adjustable limit stop.

6. A trimming device as claimed in claim 1 in which the cutter drum is mounted revolvably upon an axle connected to and fixed with respect to the mounting bridle, and the bar mounting means is disposed substantially vertically within said drum, said mounting means having a spring adapted to yieldably urge the bar against the inner surface of the cutter drum.

7. A trimming device as claimed in claim 1 in which the cutter drum comprises a pair of end wheel members and a series of substantially helically-mounted guide members fixed between said wheel members and spaced around the periphery thereof, said guide members being formed to provide a cutter drum having substantially cylindrical inner and outer surfaces of revolution, said cutter drum being mounted revolvably upon an axle which is connected to and fixed with respect to the mounting bridle, and the bar mounting means is disposed substantially vertically within said drum, said mounting means having a spring adapted to yieldably urge the cutter bar against the lowermost line of the inner surface of the cutter drum.

8. A trimming device as claimed in claim 1 in which the cutter drum is mounted revolvably upon an axle connected to and fixed with respect to the mounting bridle, and the bar mounting means is disposed substantially vertically within said drum, said bar mounting means comprising at least one mounting post fixed to the cutter bar, each said post having a stop member substantially adjacent said cutter bar and having an adjustable limit stop on the other end thereof, each said post being arranged to pass through the fixed axle of the device, and spring means disposed between said stop member and said axle, said spring means being adapted to urge said cutter bar and said axle to mutually remote positions delimited by said limit stop, whereby said cutter bar is yieldably urged against the lowermost line along the inner surface of the cutter drum with a pressure which is adjustable by virtue of said adjustable limit stop.

9. A trimming device as claimed in claim 1 in which the cutter drum comprises a pair of end wheel members and a series of substantially helically-mounted guide members fixed between said wheel members and spaced around the periphery thereof, said guide members being formed to provide a cutter drum having substantially cylindrical inner and outer surfaces of revolution, said cutter drum being mounted revolvably upon an axle which is connected to and fixed with respect to the mounting bridle, said mounting means being disposed substantially vertically within said drum, said bar mounting means comprising at least one mounting post fixed to the cutter bar, each said post having a stop member substantially adjacent said cutter bar and having an adjustable limit stop on the other end thereof, each said post being arranged to pass through the fixed axle of the device, and spring means disposed between said stop member and said axle, said spring means being adapted to urge said cutter bar and said axle to mutually remote positions delimited by said limit stop, whereby said cutter bar is yieldably urged against the lowermost line along the inner surface of the cutter drum with a pressure which is adjustable by virtue of said adjustable limit stop.

References Cited in the file of this patent

UNITED STATES PATENTS

| | | |
|---|---|---|
| 1,992,119 | Campier | Feb. 19, 1935 |
| 2,465,405 | Strawn | Mar. 29, 1949 |